Nov. 11, 1947.         G. F. HOFFMAN         2,430,638
PIVOTED-JAW SCREW CAP REMOVER
Filed Nov. 30, 1945

INVENTOR.
GEORGE F. HOFFMAN
BY
Irving Seidman
ATTORNEY

Patented Nov. 11, 1947

2,430,638

UNITED STATES PATENT OFFICE 2,430,638

PIVOTED-JAW SCREW CAP REMOVER

George F. Hoffman, New York, N. Y.

Application November 30, 1945, Serial No. 631,917

2 Claims. (Cl. 81—3.44)

1

This invention relates to a device for removing screw caps from bottles, cans, jars and the like.

Broadly, it is an object of my invention to provide a pair of opposed gripper arms which are easily adjusted to the periphery of a bottle screw cap for easy removing.

More particularly, it is an object of my invention to provide a pair of gripper arms for removing screw caps from various articles such as jars, the said gripper arms adapted to be pivoted within a handle and further adapted to be easily removed from said handle for ready use.

Still a further object of my invention is to provide a pair of gripper arms for removing screw caps of various sizes, the arms being adapted to be folded into a handle containing a knife blade and other useful tools, such as, a bottle cap remover, screw driver, can opener, etc.

For a fuller understanding of the nature and objects of my invention, reference is had to the following detailed description, in connection with the accompanying drawings, in which.

Figure 1:
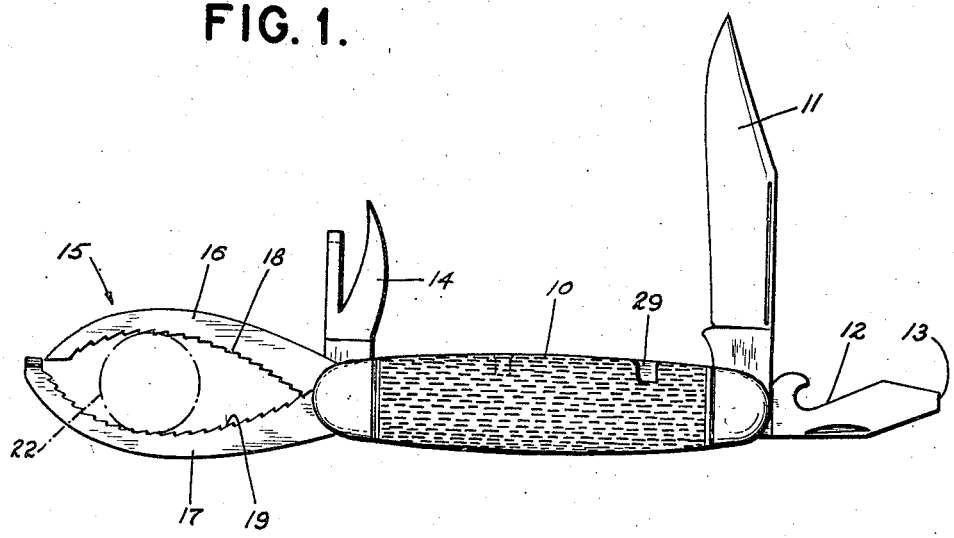
Figure 1 is a side elevation of a knife handle with various tools, such as, a knife blade, bottle cap remover, can opener, screw driver and bottle screw cap remover shown in open position.

Referring to the drawings, numeral 10 represents a handle for receiving various tools, such as, knife blade 11, bottle cap remover 12 and screw driver 13, can opener 14 and bottle screw cap remover 15. All of the above tools enumerated are adapted to be retained within the handle 10 against spring tension in a manner well known in the field of pocket knives.

I do not claim to be the inventor of such tools, such as a knife blade, bottle cap remover, can opener or other articles to fit within a knife handle against spring tension. However, I have provided a pair of opposed gripper arms 16 and 17 having a series of teeth 18 and 19 along the inside edges which are adapted to grip the vertical sides of a screw cap in order to remove the same from a bottle or jar; the said opposed gripper arms being adapted to pivot against spring tension 30, so that both arms may be housed within a handle such as 10. Of course, I do not desire to be limited to the specific shape of the handle shown in the drawings, nor do I desire to be limited to a handle to house a multiplicity of tools also shown in Figure 1.

My invention is specifically directed to a bottle screw cap remover to be housed within a handle against spring tension so that the gripper arms can be readily removed from the handle for ready use for a variety of sizes of bottle screw caps.

Figure 2:
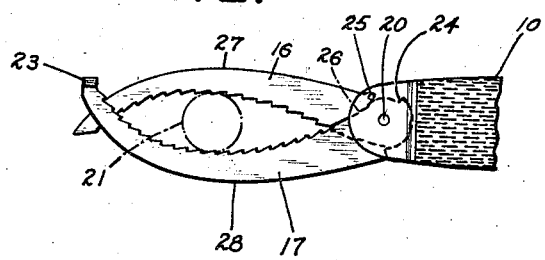
Figure 2 is a side elevation of the bottle screw cap remover showing the gripper arms adjusted to receive a screw cap of smaller size than that shown in Figure 1, a portion of the knife being broken away.

The gripper arms 16 and 17 are pivoted about pivot pin 20 so that both arms 16 and 17 can be moved manually about the pivot pin 20 to fold within the handle 10. The arms 16 and 17 are adjacent and overlap one another so that the ends of the arms 16 and 17 may pass one another, as shown in Figure 2, in order to act upon a smaller bottle screw cap 21 shown in dot-dash line in Figure 2. When the arms 16 and 17 are further apart they may accommodate a larger bottle screw cap 22 as shown in Figure 1. At the extreme end of gripper arm 17 there is a right angle extension 23 which acts both as a stop for the gripper arm when it falls within the handle 10 and also as a finger piece permitting the fingernail to open the gripper arms 16 and 17 in the positions shown in Figures 1 and 2.

Figure 3:
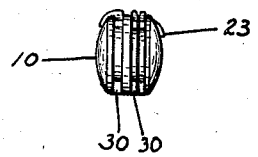
Figure 3 is an end view of the knife shown in Figure 1 showing all of the tools in closed position.
Figure 4:
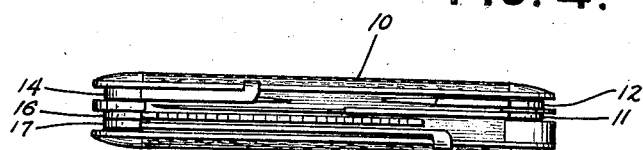
Figure 4 is a top view of the knife shown in Figure 1 with the various tools in closed position.
Figure 5:
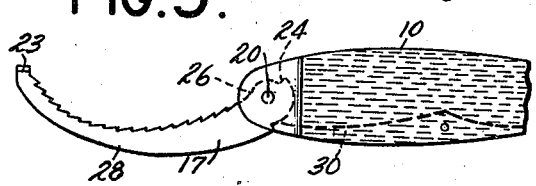
Figure 5 is a fragmentary view showing the action of the springs against the edges of the arms.

When the gripper arms 16 and 17 are in closed position within the handle 10, as shown in Figures 3 and 4, the fingernail, preferably the thumbnail, lifts the gripper arm 17 out of the walls of the handle 10 and when the arm 17 revolves to a certain point, a shoulder 24 catches pin 25 which is attached to gripper arm 16 and raises or opens the gripper arm 16 which is also to be removed from the handle 10. When it is desired to place the gripper arms 16 and 17 within the handle 10, the gripper arm 17 is manually pivoted about pin 20 and at a certain point the pin 25 will be caught along the edge 26 of the gripper arm 17, so that the arm 16 will also be carried into the handle 10. The finger piece 23 falls within a notch 29 of the handle 10, so that only a small portion of it extends upon the side of the handle, as shown in Figure 3, sufficient however, for the fingernail to grip the finger piece 23 in order to remove the arm 17 from the handle.

In order to remove a screw cap from a bottle or jar, the gripper arms 16 and 17 are placed against the vertical sides of the cap which usually has vertical ridges, and when pressure is applied to the outside edges 27 and 28, the teeth 18 and 19 grip such vertical ridges of the cap and provide sufficient tension to loosen the screw cap from the bottle or jar.

It is obvious that various modifications and changes may be made in the details of construction without departing from the general spirit of the invention.

I claim:

1. In a screw cap remover of the character described, a pair of opposed gripper arms having teeth along the interior edges thereof, a handle for housing said gripper arms, one of said arms having at its free end a finger piece at right angles to said end, said finger piece adapted to be housed within a notch in said handle to permit said gripper arms to be removed from said handle, tension springs within said handle acting against the edges of said gripper arms to hold said gripper arms under tension within said handle and when in open position, said gripper arms overlapping one another whereby screw caps of various sizes may be removed from bottles, jars and the like.

2. In a screw cap remover of the character described, a handle, a pair of opposed gripper arms pivotally mounted and housed in said handle, one of said arms having a pin projecting at right angles to the overlapping face of one of said arms and the other arm having a shoulder substantially the same radial distance from the pivot of said arms as said pin and adapted to engage said pin for opening said gripper arm, said pin also acting to close said gripper arm by contacting the inner edge of the other gripper arm, teeth along the interior edges of said gripper arms, a finger piece on the free end of one of said arms extending at right angles to said arm, said fingerpiece being housed within a notch in said handle when the arms are closed, a spring member at the base of said handle for supplying tension upon said gripper arms retaining said arms in open or closed position, said arms adapted to overlap one another to accommodate screw caps of various sizes.

GEORGE F. HOFFMAN.

REFERENCES CITED

The following references are of record in the file of this patent:

UNITED STATES PATENTS

| Number | Name | Date |
| --- | --- | --- |
| 94,703 | Blake | Sept. 14, 1869 |
| 136,693 | Bartle | Mar. 11, 1873 |
| 1,472,826 | Champlin | Nov. 6, 1923 |
| 1,994,532 | Ratzlaff | Mar. 19, 1935 |